(12) United States Patent
Ahrens et al.

(10) Patent No.: US 11,028,918 B2
(45) Date of Patent: Jun. 8, 2021

(54) PLANET GEAR CARRIER FOR AN EPICYCLIC GEAR TRAIN AND SERIES OF EPICYCLIC GEAR TRAINS

(71) Applicant: Bühler Motor GmbH, Nuremberg (DE)

(72) Inventors: Matthias Ahrens, Nuremberg (DE); Fabian Zimber, Forchheim (DE); Katherine Bee, Nuremberg (DE)

(73) Assignee: BÜHLER MOTOR GMBH, Nuremberg (DE)

(*) Notice: Subject to any disclaimer, the term of this patent is extended or adjusted under 35 U.S.C. 154(b) by 134 days.

(21) Appl. No.: 16/298,301

(22) Filed: Mar. 11, 2019

(65) Prior Publication Data
US 2019/0285169 A1    Sep. 19, 2019

(30) Foreign Application Priority Data
Mar. 16, 2018    (DE) ................. 10 2018 204 051.6

(51) Int. Cl.
*F16H 57/08*    (2006.01)
*F16H 1/46*    (2006.01)

(52) U.S. Cl.
CPC .......... *F16H 57/082* (2013.01); *F16H 1/46* (2013.01)

(58) Field of Classification Search
None
See application file for complete search history.

(56) References Cited

U.S. PATENT DOCUMENTS

| | | | | |
|---|---|---|---|---|
| 2,401,875 A | * | 6/1946 | Lawler | F16H 1/46 475/342 |
| 3,596,538 A | * | 8/1971 | Braun | F16H 1/46 475/342 |
| 3,885,656 A | * | 5/1975 | Michling | B66D 1/22 192/225 |
| 4,142,426 A | * | 3/1979 | Baranyi | F16H 1/46 475/340 |

(Continued)

FOREIGN PATENT DOCUMENTS

| | | |
|---|---|---|
| DE | 101 32 303 A1 | 1/2003 |
| DE | 10 2015 006 311 A1 | 11/2016 |
| EP | 2 479 458 A1 | 7/2012 |

OTHER PUBLICATIONS

Search Report dated Feb. 1, 2019, issued in counterpart German Patent Application No. 10 2018 204 051.6 (6 pages).

*Primary Examiner* — Colby M Hansen
(74) *Attorney, Agent, or Firm* — Westerman, Hattori, Daniels & Adrian, LLP

(57) ABSTRACT

A series for an epicyclic gear train and a planet gear carrier consisting of a carrier base with a plurality of axial receptacles for bearing pins of planet gears and a depression for receiving an axial section of a pinion. The object of the present invention is to specify a planet gear carrier, which shifts the boundaries of the reduction range such that a greater variation of the reduction gear ratios is possible, wherein an economical process is used and reliable production is ensured. Also described is a series of planetary gear trains having the same properties. In the case of series, the number of components is in particular to be minimized by increasingly using common parts that can be combined with other common parts.

19 Claims, 5 Drawing Sheets

(56) References Cited

U.S. PATENT DOCUMENTS

| | | | | |
|---|---|---|---|---|
| 4,791,833 A | * | 12/1988 | Sakai | B25F 5/001 |
| | | | | 475/299 |
| 5,658,215 A | | 8/1997 | Premiski et al. | |
| 2003/0216213 A1 | * | 11/2003 | Yamamoto | F16H 1/32 |
| | | | | 475/330 |
| 2007/0068583 A1 | * | 3/2007 | Johnson | F16K 31/043 |
| | | | | 137/625.31 |
| 2008/0173459 A1 | * | 7/2008 | Kuroyanagi | B25F 5/001 |
| | | | | 173/216 |
| 2010/0093484 A1 | * | 4/2010 | Huang | H02K 7/116 |
| | | | | 475/330 |
| 2010/0120576 A1 | * | 5/2010 | Satou | F16H 57/08 |
| | | | | 475/348 |
| 2012/0046142 A1 | * | 2/2012 | Miyawaki | G03G 15/757 |
| | | | | 475/331 |
| 2013/0264165 A1 | | 10/2013 | Cripsey | |
| 2014/0080658 A1 | * | 3/2014 | Edelmann | F16H 57/08 |
| | | | | 475/331 |
| 2015/0101434 A1 | * | 4/2015 | Asano | F16H 57/033 |
| | | | | 74/416 |

\* cited by examiner

PLANET GEAR CARRIER FOR AN EPICYCLIC GEAR TRAIN AND SERIES OF EPICYCLIC GEAR TRAINS

CROSS-REFERENCE TO RELATED APPLICATIONS

The present patent application claims priority from German Application No. DE 10 2018 204 051.6, filed Mar. 16, 2018, which is incorporated herein by reference in its entirety.

BACKGROUND OF THE INVENTION

(1) Field of the Invention

The invention relates to a planet gear carrier for an epicyclic gear train, consisting of a carrier base with a plurality of axial receptacles for bearing pins of planet gears and a depression for receiving an axial section of a pinion.

(2) Description of Related Art Including Information Disclosed Under 37 CFR 1.97 and 1.98

Planet gear carriers are components of planetary gear trains that are used very frequently and in a variety of ways to increase torques. Electric motors regularly serve as drives. Areas of use are, for example, industrial applications or medical technology. Planetary gear trains have the advantage that they are very suitable for being flanged to an electric motor because they can be adapted to the rotationally symmetrical shape thereof. Geared motors of this type are therefore also particularly well suited as tubular motors. Planetary gear trains can also be easily constructed in several stages, without having to substantially change the outer shape. Naturally, in the case of reduction gear trains, the highest torque loads occur at the output gear stages. Accordingly, particularly high demands are made on the construction, the material, and the design of an output planet gear carrier. Planet gear carriers can be produced very economically in particular by sintering processes. Planetary gear trains are also characterized by a very compact and space-saving design. This property becomes increasingly important particularly in the medical field and is frequently the decisive criterion in the selection of individual components, assemblies, or entire systems. In addition, a robust design and ultimately also reliable manufacturability are also important. In the case of sintering processes, minimum wall thicknesses must be taken into account, which partially restrict the freedom of design.

Plastic injection molding or the metal injection molding (MIM) process are deemed alternatives to sintering. Plastic parts are often used in case of lower requirements for the output torque. Overmolded output shafts are also frequently used. In case of higher torques, metal parts which can also be produced as turned or milled parts are often chosen. As a result of the machining, they are no longer economical in particular in the case of higher quantities. The MIM process is suitable for filigree components. However, high tooling costs must be borne in this case. Sintering processes are more cost-effective. In this case, however, wall thicknesses greater than 0.5 mm are required to reliably produce high-quality parts.

BRIEF SUMMARY OF THE INVENTION

The object of the present invention is therefore to specify a planet gear carrier, which shifts the boundaries of the reduction range such that a greater variation of the reduction gear ratios is possible, wherein an economical process is used and reliable production is ensured. Also described is a series of planetary gear trains having the same properties. In the case of a series, the number of components is in particular to be minimized by increasingly using common parts that can be combined with other common parts.

Pinions can be partially lowered into the carrier base by means of a depression. This is necessary in some cases when compromises with regard to the geometric design must be made when using common parts. In the case of certain diameters of the depression that come close to the receptacles for the bearing pins, the design rules for sintered parts may be broken. In order to avoid this and nevertheless be able to use the advantages mentioned, the invention provides that the wall between the depression and the receptacles for the bearing pins is broken through so that its narrowest sections are removed. Since these openings are oriented radially in the direction of the axis of rotation of the planet gear carrier, but the forces on the bearing pins act essentially in the circumferential direction, the accompanying downsizing of the bearing surface can be managed without having to accept strength losses. The depression permits a compact and space-saving design or, alternatively, a larger receiving space for the sun gear.

The axial extent of the radial opening should expediently correspond to the depth of the depression. This avoids additional edges, which an associated pinion could possibly run up against.

Sharp edges with regard to the tool life cannot be recommended for sintered parts. Thin high walls cannot be produced. For this reason, transition regions between the depression and the receptacle are rounded. The roundings can define the width of the opening.

The radius of the rounding should be $<=0.5$ mm, preferably $<=0.35$ mm, and in particular $<=0.25$ mm. In case of a larger radius, the diameter of the depression would be correspondingly smaller and the possible reduction range would be smaller. Moreover, an opening could be omitted given a larger radius.

A better definition for the minimum wall thickness is as follows: The depression defines a circle with a diameter $d1$, the receptacle defines a circle with a diameter $d2$, and the distance A of the circles satisfies the following condition: $A<=(d1+d2)/2+1$ mm, in particular: $A<=(d1+d2)/2+0.7$ mm or $A<=(d1+d2)/2+0.5$ mm. When three planet gears are used, three openings are provided; given more planet gears, correspondingly more openings.

This invention particularly claims carrier bases in which the depression has a maximum diameter, in case of which a contact between the pinion and the bearing pin can still be reliably avoided. The pinion must be accommodated in the depression with play. The range of possible reduction ratios can thereby be extended.

The axial receptacles have the shape of a bore and serve as bearing surfaces for the bearing pins. The inner surfaces of the receptacles can have lubrication grooves or similar deviations from a cylinder jacket surface. The openings are also a deviation from the cylinder jacket surface. However, this has, as mentioned, no serious effects on the bearing quality, because the higher forces occur at sections of the bearing surfaces arranged in the circumferential direction of the planet gear carrier. Additional bearing elements are not provided. The bearing pins rotate in the receptacles. The lateral surfaces of the bearing pins and the inner circumferential surfaces of the receptacles serve directly as bearing surfaces. During operation, the bearing pins rotate in the receptacles, wherein wearing and loading zones are formed radially in the movement direction, said zones being displaced by a small angle as a result of the bearing friction. Hardly any forces occur radially to the center. The strength requirements for the planet gear carrier are low in the corresponding regions and in the corresponding directions. For the reasons stated, the regions of the inner circumferential surface directed radially toward the axis of rotation and serving as bearing surfaces are weakened, without critical component loads resulting. The selectively introduced openings in the unloaded regions allow the reliable production of the carrier base in the sintering process.

The receptacles are arranged on a first circular line. In particular with regard to the desired series for an epicyclic gear train, it is important to achieve an increase in the number of variants without a greater number of parts. This is achieved by a set of additional receptacles in the carrier base. Depending on the desired reduction, either the receptacles or the additional receptacles are used as bearing surfaces in this case. The additional receptacles are arranged on a second circular line with a radius different from that of the first circular line. If the receptacles serve as bearing surfaces, the additional receptacles are provided as connecting sections for a cover ring, or vice versa.

According to the invention, the carrier base is produced from metal powder by a sintering process. The metal powder can be pressed into a wide variety of molds and subsequently sintered. In a development of the invention, a protrusion is provided on the side of the carrier base opposite the depression. This protrusion compensates for the material weakening caused by the depression.

The planet gear carrier according to the invention is best suited for use in a planetary gear train with a diameter <=23 mm, preferably <=22 mm and in particular <=16 mm. The planet gear carrier according to the invention is expediently suitable in particular for an output planet gear carrier of a planetary gear train with a plurality of stages, in particular 2, 3, or 4 stages.

Since the carrier base consists of a metal material, an output shaft can be pressed into the recess thereof. In order to be able to support and guide the planet gears optimally, the planet gear carrier has a cover ring which is connected to the carrier base. For this purpose, the cover ring has connecting pins which define a distance from the carrier base and engage therein. The connecting pins consist of a spacer section and a pin section which engage in additional receptacles of the carrier base.

The angular distances between adjacent receptacles, the angular distances between adjacent additional receptacles, and the angular distances between adjacent receptacles and additional receptacles are identical. In this way, the additional receptacles can alternatively be used as receptacles and vice versa.

When using three planet gears, it is provided that the angular distances between adjacent receptacles, the angular distances between adjacent additional receptacles, and the angular distances between adjacent receptacles and additional receptacles are 60°.

The cover ring preferably consists of a plastic material. As a result, it can be produced very simply and economically in one piece. Furthermore, claimed is a series of epicyclic gear trains, comprising a planet gear carrier, wherein the planet gear carrier can be combined in at least two different variants with a different arrangement of planet gears and the use of identical carrier bases but different cover rings.

The receptacles and the additional receptacles may, depending on the choice of cover ring, serve both as bearing for the bearing pins and as connection region for connecting with the pin sections of the connecting pins.

BRIEF DESCRIPTION OF THE SEVERAL VIEWS OF THE DRAWINGS

An exemplary embodiment of the invention is explained in more detail below with reference to the drawing. The following is shown.

Figure 1:
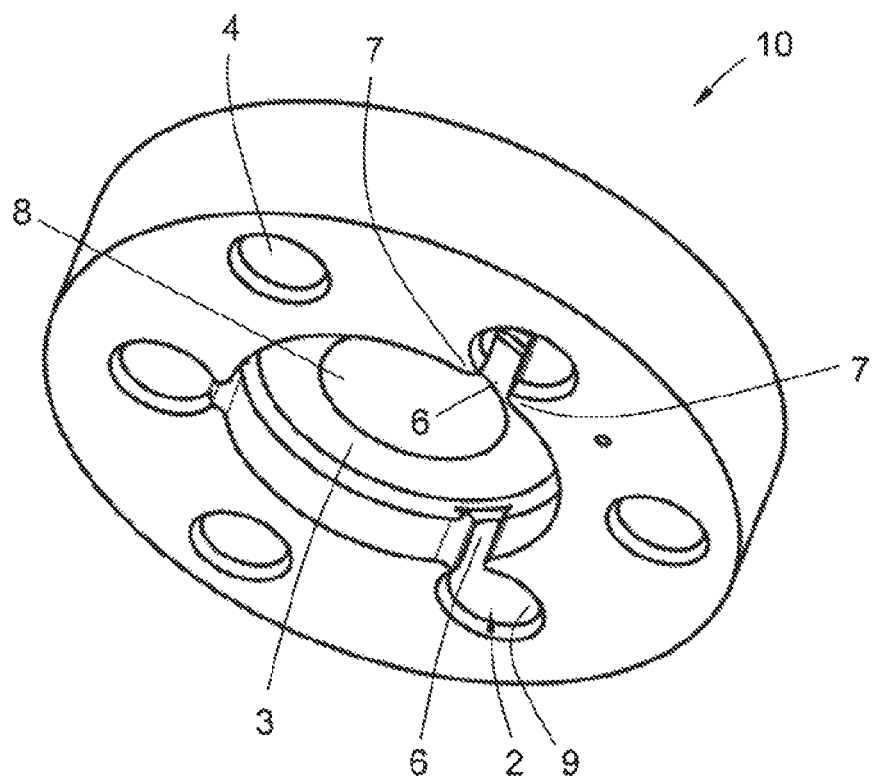
FIG. 1 is a three-dimensional view of a front side of a carrier base.

Note: The reference symbols with index and the corresponding reference symbols without index refer to details with the same name in the drawings and the drawing description. This reflects use in another embodiment or the prior art, and/or where the detail is a variant. For the sake of simplicity, the detailed description and the list of reference symbols.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 6:
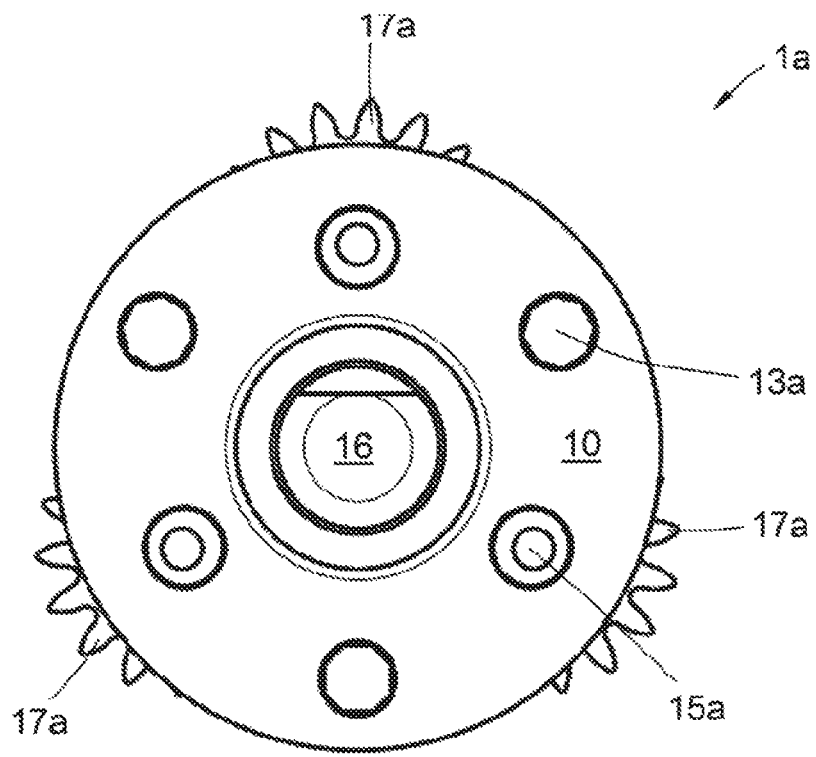
FIG. 6 is a front view of the first planet gear carrier.

FIG. 1 shows a three-dimensional view of a front side of a carrier base 10, which has a first set of receptacles 2 for bearing pins of planet gears, which has a smaller pitch circle diameter than a second set of receptacles 4. In the example shown, there are three receptacles per set. The receptacles of both sets are staggered by 60° relatively to one another while the receptacles 2 are staggered 120° relative to each other and receptacles 4 are staggered 120° relative to each other. The carrier base 10 has a central recess 8 which serves to receive an output shaft 16 (FIG. 6). The output shaft may be pressed in or attached by another method. An annular region arranged around the recess 8 is lowered in the shape of a depression 3 relatively to an inner circumferential surface 9. A pinion 14 (FIG. 9) is to be able to be at least partially axially received in the depression 3. The pinion 14 may be an engine output pinion or a pinion 14 of an upstream planetary gear stage. The diameter of the depression 3 is so large that a narrow wall would form between the depression 3 and the receptacles 2. So that design rules for sintered parts are not broken thereby and the maximum possible diameter for receiving a pinion 14 can still be produced, the narrow wall was broken through and the otherwise tapered transition regions 7 were rounded at their corners.

Figure 2:
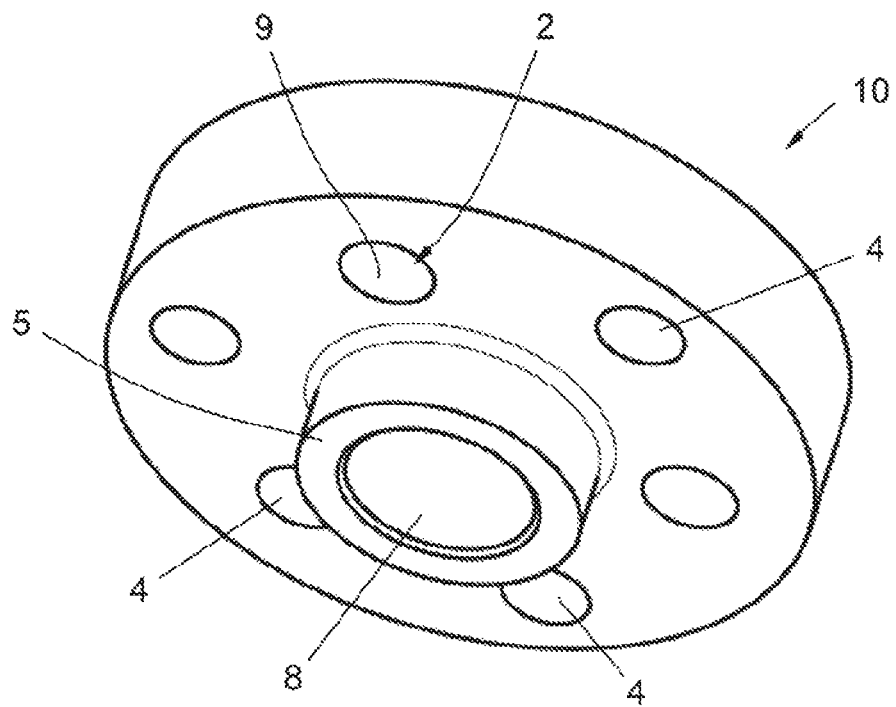
FIG. 2 is a three-dimensional view of a rear side of the carrier base.

FIG. 2 shows a three-dimensional view of a rear side of the carrier base 10, with the receptacles 2 of the first set and the receptacles 4 of the second set, the radial opening 6 (see FIG. 1), and the central recess 8. Provided around the latter is an annular protrusion 5, which allows an axial stop and increases the stability of the carrier base 10.

Figure 3:
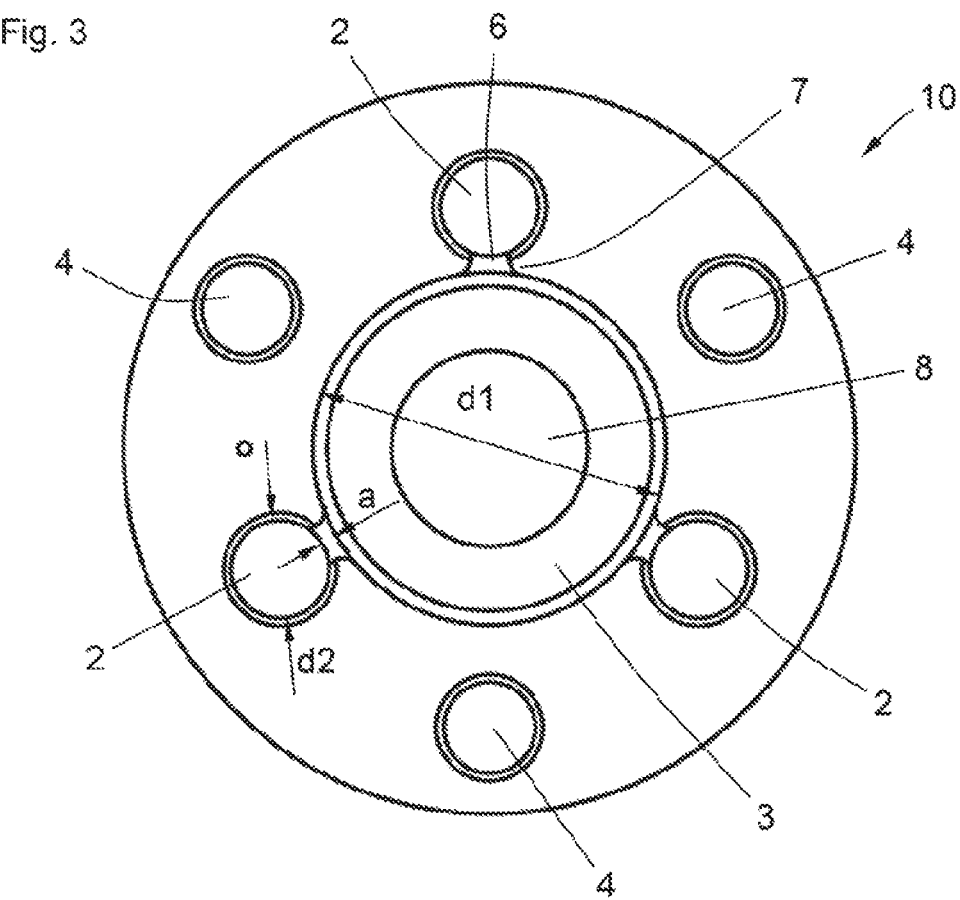
FIG. 3 is a front view of the carrier base.

FIG. 3 shows a front view of the carrier base 10, with the receptacles 2, the transition regions 7, the additional receptacles 4, the depression 3, the openings 6, and the recess 8. A diameter d1 of the depression 3, a diameter d2 of a receptacle 2, and a distance A between the peripheral circles of the depression 3 and the receptacle 2 are additionally shown. The distance A fulfills the following condition: $A \leq (d1+d2)/2+k$, where k is 1 mm, in particular 0.7 mm, in particular 0.5 mm.

Figure 4:
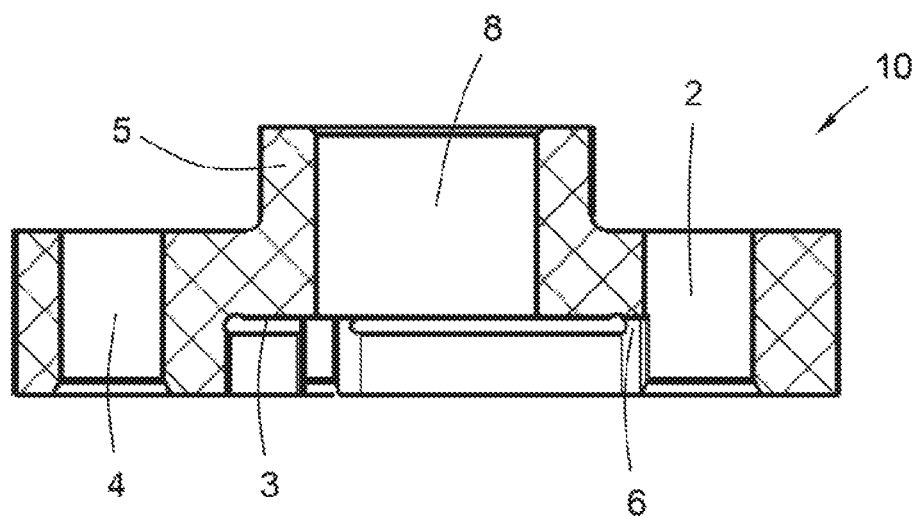
FIG. 4 is a sectional view of the carrier base.

FIG. 4 shows a sectional view of the carrier base 10, with a receptacle 2, an additional receptacle 4, the depression 3, an opening 6, the annular protrusion 5, and the recess 8.

Figure 5:
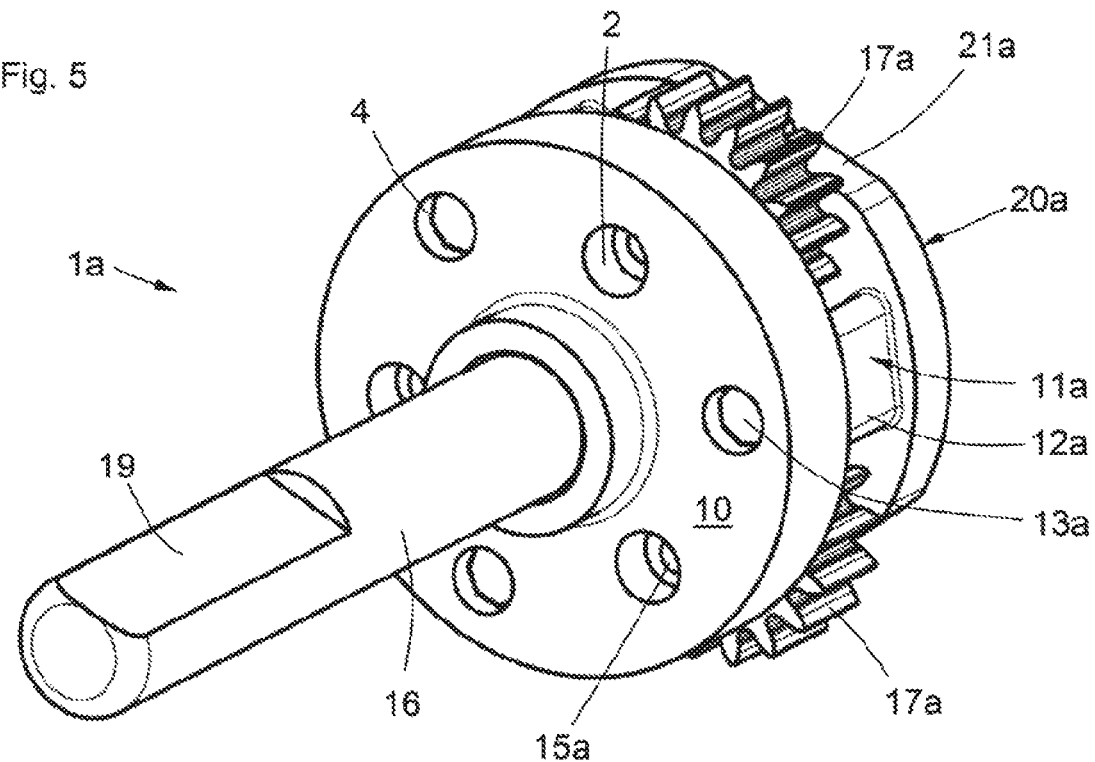
FIG. 5 is a three-dimensional representation of a first equipped planet gear carrier.

FIG. 5 shows a three-dimensional representation of a first equipped planet gear carrier 1a which forms a planet cage for planet gears 17a. The planet gear carrier 1a consists of a carrier base 10, a cover ring 20a, and an output shaft 16. The cover ring 20a is integral with the connecting pins 11a, which extend in parallel to the axis and consist of a spacer section 12a and a pin section 13a. The spacer sections 12a have a diameter greater than that of the pin sections 13a; however, they are not circular but substantially triangular. The pin sections 13a engage in additional receptacles 4 and are non-positively connected thereto. In order to achieve a good press connection and high stability, the pin sections 13a are polygonal. There are three planet gears 17a and three connecting pins 11a. The planet gears 17a have bearing pins 15a, which are mounted in receptacles 2 of the carrier base 10 and corresponding receptacles of the cover ring 20a. The cover ring 20a has flattened sides 21a, which serve to clearly identify and align the respective cover ring 20a.

FIG. 6 shows a front view of the first planet gear carrier 1a, with the carrier base 10, the planet gears 17a, the output shaft 16, the pin sections 13a, and the bearing pins 15a of the planet gears 17a.

Figure 7:
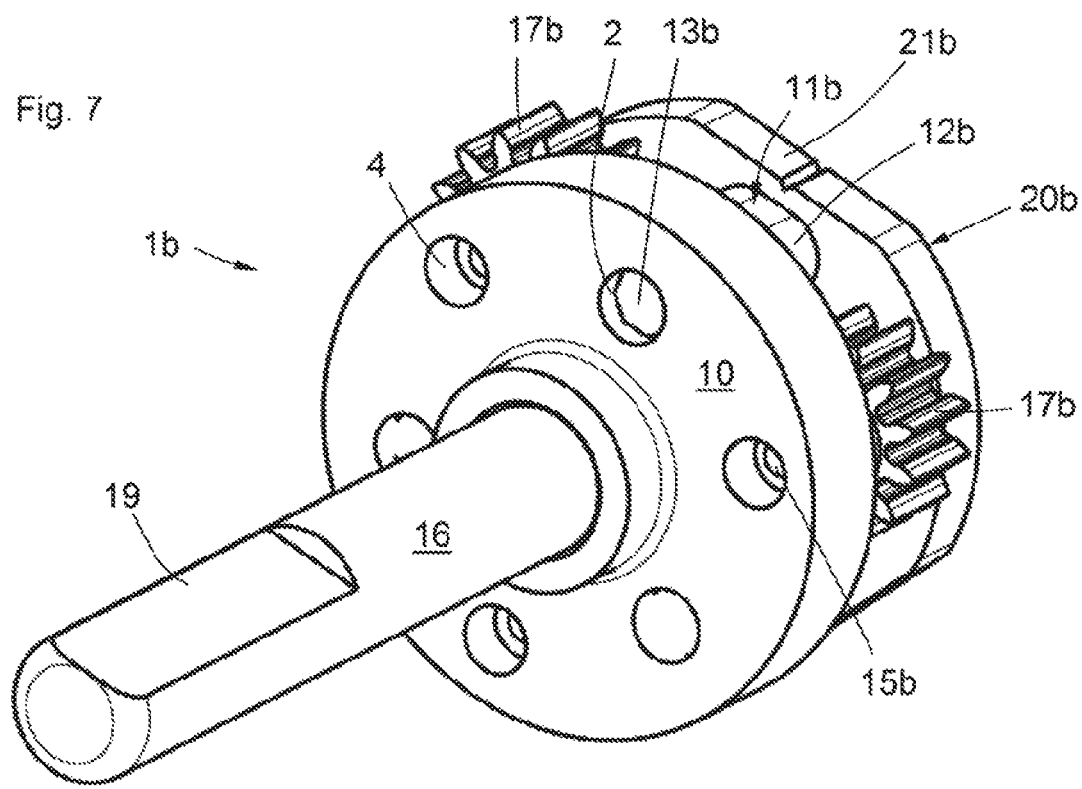
FIG. 7 is a three-dimensional representation of a second equipped planet gear carrier.

FIG. 7 shows a three-dimensional representation of a second equipped planet gear carrier 1b, which forms a planet cage for planet gears 17b. The planet gear carrier 1b consists of the same carrier base 10, an alternative cover ring 20b, and the output shaft 16. The cover ring 20b is integral with connecting pins 11b, which extend in parallel to the axis and consist of a spacer section 12b and a pin section 13b. The spacer sections 12b have a diameter greater than that of the pin sections 13b; however, they are not circular but flattened and, in this way, differ from the cross-sectional shape of the corresponding ones. The pin sections 13b engage in the receptacles 2 and are non-positively connected thereto. In order to achieve a good press connection and high stability, the pin sections 13b are polygonal. There are three planet gears 17b and three connecting means 11b. The planet gears 17b have bearing pins 15b, which are mounted in the additional receptacles 4 of the carrier base 10 and corresponding receptacles of the cover ring 20b. The cover ring 20b has flattened sides 21b, which serve to clearly identify and align the respective cover ring 20b.

Figure 8:
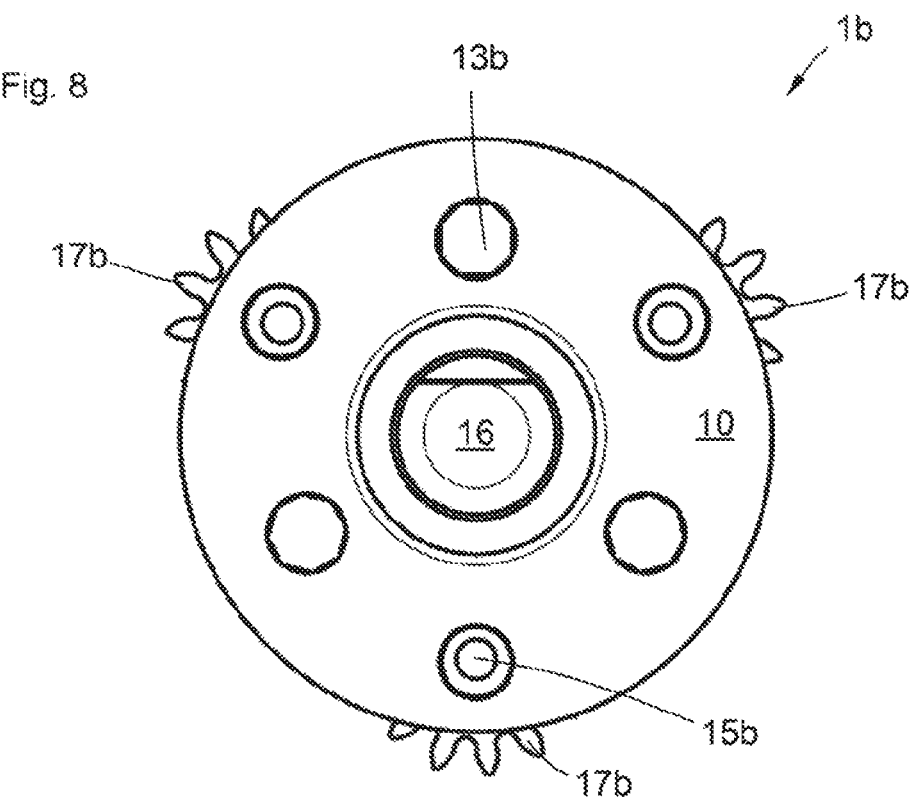
FIG. 8 is a front view of the second planet gear carrier.

FIG. 8 shows a front view of the second planet gear carrier 1b with the carrier base 10, the planet gears 17b, the output shaft 16, the pin sections 13b, and the bearing pins 15b of the planet gears 17b.

Figure 9:
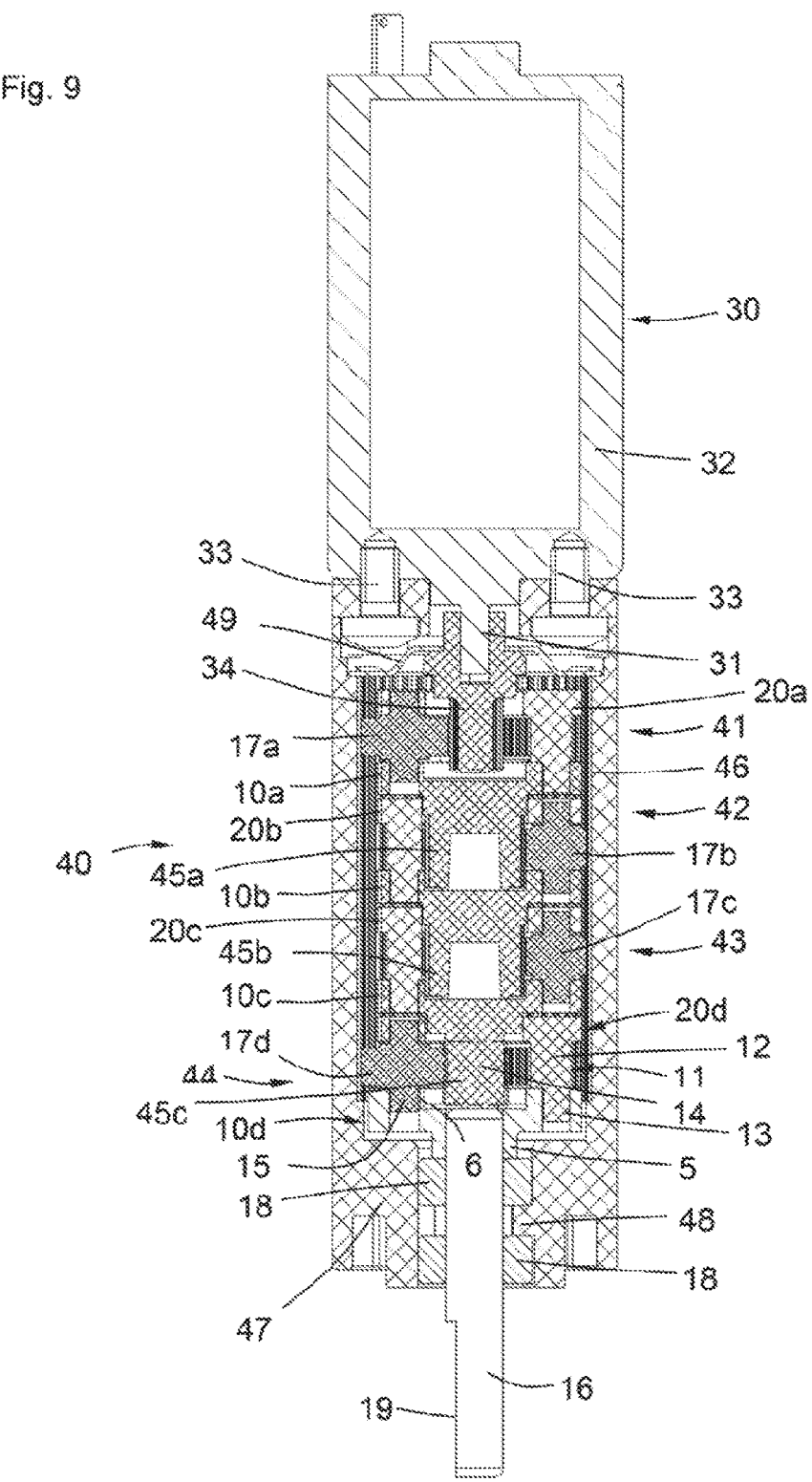
FIG. 9 is a sectional view through a geared motor.

FIG. 9 shows a sectional view through a geared motor, with an electric motor 30 consisting of a motor housing 32 (stylized), and a motor shaft 31 (simplified section), and an epicyclic gear train 40, which is fastened to the electric motor 30 by means of fastening screws 33. The epicyclic gear train 40 is a four-stage planetary gear train, having a first gear stage 41, a second gear stage 42, a third gear stage 43, and a fourth gear stage 44, which at the same time is an output gear stage and has an output shaft 16. The individual gear stages respectively consist of a central pinion 45a, 45b, 45c, which is integral with a carrier base 10a, 10b, 10c, of planet gears 17a, 17b, 17c, 17d, which engage in the pinions 45a, 45b, or 45c and are mounted on the carrier base 10a, 10b, or 10c. Each carrier base is assigned a cover ring 20a, 20b, 20c, 20d. The output shaft, which consists of a metal material, is connected to the carrier base 10d, which consists of a sintered material. The first gear stage 41 consists of the motor pinion, the planet gears 17a, and the carrier base 10a. All planet gears 17a, 17b, 17c, 17d are engaged in a ring gear 46, which is part of the gear housing and has a continuous toothing. The output shaft 16 is mounted in two slide bearings 18 which are accommodated at a small distance from one another in an end shield 47 integral with the ring gear. The distance between the slide bearings 18 is defined by a stop 48 therebetween. The motor pinion 34 is fixed to the gear housing by a retaining spring 49. In addition, a flattening 19, the output shaft 16, the opening 6, the bearing pins 15, the spacer section 12, the pin section 13, the connecting pin 11, and the protrusion 5 are shown.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS

1 Planet gear carrier
2 Receptacle
3 Depression
4 Additional receptacle
5 Protrusion
6 Opening
7 Transition region
8 Recess
9 Inner circumferential surface
10 Carrier base
11 Connecting pin
12 Spacer section
13 Pin section
14 Pinion
15 Bearing pin
16 Output shaft
17 Planet gear
18 Slide bearing
19 Flattening
20 Cover ring
21 Flattened side
30 Electric motor
31 Motor shaft
32 Motor housing
33 Fastening screw
34 Motor pinion
40 Epicyclic gear train
41 First gear stage
42 Second gear stage
43 Third gear stage
44 Fourth gear stage
45 Pinion
46 Ring gear
47 End shield 48 Stop
49 Retaining spring

What is claimed is:

1. A planet gear carrier for an epicyclic gear train, the planet gear carrier comprising:
   a plurality of planet gears, each having a bearing pin;
   a pinion with an axial section;
   a carrier base with a plurality of first axial receptacles each spaced from each other and each for receiving one of the bearing pins of the plurality of planet gears;
   a plurality of second receptacles in the carrier base, each of said receptacles being arranged at a present range between adjacent first receptacles;
   a cover ring having a plurality of integral connecting pins, each connecting pin having a spacer section and a pin section, each of the second receptacles receiving a pin section in order to achieve a connection between the carrier base and the cover ring; and
   a depression with a predetermined depth in the carrier base for receiving the axial section of the pinion, wherein a radial opening is present between the depression and at least one of the axial receptacles and constitutes a spatial connection between the depression and the at least one axial receptacle.

2. The planet gear carrier according to claim 1, wherein the axial extent of the radial opening corresponds to the depth of the depression.

3. The planet gear carrier according to claim 1, further comprising a rounded transition region between the depression and the receptacle.

4. The planet gear carrier according to claim 1, wherein the depression in centrally located in the carrier base and defines a circle with a diameter d1, the receptacle defines a circle with a diameter d2, and the distance A of the circles satisfies the following condition: $A \leq (d1+d2)/2+k$ where k is between 0.7 mm and 0.5 mm.

5. The planet gear carrier according to claim 1, wherein the depression has a diameter greater than that of the pinion engaging therein.

6. The planet gear carrier according to claim 1, wherein the axial receptacles have the shape of a bore and serve as bearing surfaces for the bearing pins.

7. The planet gear carrier according to claim 1, wherein the carrier base is molded from a powdered state.

8. The planet gear carrier according to claim 7, wherein the carrier base is produced by a sintering process.

9. The planet gear carrier according to claim 1, wherein the carrier base has an annular protrusion on a side opposite the depression.

10. The planet gear carrier according to claim 1, wherein the diameter of a planetary gear train equipped therewith is in the range between less than of equal to 16 mm and less than or equal to 23 mm.

11. The planet gear carrier according to claim 1, wherein the planet gear carrier is an output planet gear carrier of a planetary gear train with at least two stages.

12. The planet gear carrier according to claim 1, further comprising a recess in the depression and an output shaft pressed into the recess.

13. The planet gear carrier according to claim 1, further comprising a cover ring which is connected to the carrier base.

14. The planet gear carrier according to claim 13, wherein the cover ring has connecting pins which define a distance from the carrier base and engage therein.

15. The planet gear carrier according to claim 14, wherein the connecting pin consists of a spacer section and a pin section which engage in the additional receptacles of the carrier base.

16. The planet gear carrier according to claim 1, wherein the angular distances between adjacent first receptacles, the angular distances between adjacent second receptacles, and the angular distances between adjacent first receptacles and second receptacles are identical.

17. The planet gear carrier according to claim 1, wherein the angular distances between first receptacles, the angular distances between adjacent second receptacles, and the angular distances between adjacent first receptacles and additional second receptacles are 60°.

18. The planet gear carrier according to claim 1, wherein the cover ring consists of a plastic material.

19. A series of epicyclic gear trains, with a planet gear carrier according to claim 1, wherein the planet gear carrier can be combined in at least two different variants with a different arrangement of planet gears and the use of identical carrier bases and different cover rings.

* * * * *